UNITED STATES PATENT OFFICE.

PETER STEELMAN, OF PHILADELPHIA, PENNSYLVANIA.

IMPROVEMENT IN MEDICAL COMPOUNDS.

Specification forming part of Letters Patent No. 149,262, dated March 31, 1874; application filed March 2, 1874.

*To all whom it may concern:*

Be it known that I, PETER STEELMAN, of the city of Philadelphia, State of Pennsylvania, have invented a new and Improved Compound for Curing Diseases and Disorders of the Stomach; and I do hereby declare the following to be a full, clear, and exact description of the same.

My invention consists of a mixture or combination of powdered rhubarb, bicarbonate of soda, and powdered peruvian-bark; also, of the same combined with dandelion-root; also, of a mixture composed of powdered rhubarb, bicarbonate of soda, powdered peruvian-bark, powdered aloes, powdered ginger, peppermint-leaves, dandelion-root, alcohol, water, and teaberry-oil.

To enable others skilled in the art to make and use my invention, I will describe the method of manufacture.

The proportions of the various ingredients which I prefer to use, but which, however, may be varied, are as follows: Powdered rhubarb, one dram; bicarbonate of soda, three drams; powdered peruvian-bark, one dram; powdered aloes, one-half dram; powdered ginger, two scruples; peppermint-leaves, one-half dram; dandelion-root, two drams; alcohol, two fluid ounces; water, six fluid ounces; oil teaberry, six drops. These make about one-half pint of the medicine. These ingredients are all mixed together at one time, stirred well, and allowed to stand for about ten days, with occasional agitation, so as effectually to extract the strength of the powders, &c. Then, after being strained and filtered, the admixture is ready for use.

The oil of teaberry is simply used to flavor the whole, not particularly for any medicinal properties, as any other flavoring agent may be employed in lieu of teaberry.

Having thus described my invention, what I claim as new, and desire to secure by Letters Patent, is—

1. A medicine formed of rhubarb, bicarbonate of soda, and peruvian-bark, substantially as described.

2. A medicine formed of a combination of rhubarb, bicarbonate of soda, peruvian-bark, and dandelion-root, substantially as described.

3. A medicine formed of a combination of rhubarb, bicarbonate of soda, peruvian-bark, aloes, ginger, peppermint, dandelion, alcohol, water, and oil of teaberry, or other flavoring agent, substantially as described.

PETER STEELMAN.

Witnesses:
OWEN MCDONALD,
ALBERT E. ZACHERLE.